(12) United States Patent
Vlaiko et al.

(10) Patent No.: US 12,360,686 B2
(45) Date of Patent: Jul. 15, 2025

(54) HIGHLY EFFICIENT SSD POWER MANAGEMENT THROUGH PCIe DATA RATE MODULATION

(71) Applicant: Western Digital Technologies, Inc., San Jose, CA (US)

(72) Inventors: Julian Vlaiko, Kfar Saba (IL); Nissim Elmaleh, Meitar (IL); Roni Ankonina, Sunnyvale, CA (US); Dmitry Vaysman, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 49 days.

(21) Appl. No.: 18/224,197

(22) Filed: Jul. 20, 2023

(65) Prior Publication Data

US 2025/0028457 A1    Jan. 23, 2025

(51) Int. Cl.
  *G06F 12/00*  (2006.01)
  *G06F 3/06*  (2006.01)
(52) U.S. Cl.
  CPC .......... *G06F 3/0625* (2013.01); *G06F 3/0653* (2013.01); *G06F 3/0679* (2013.01)
(58) Field of Classification Search
  CPC ..... G06F 3/0625; G06F 3/0653; G06F 3/0679
  USPC ....................................................... 711/154
  See application file for complete search history.

(56) References Cited

U.S. PATENT DOCUMENTS

| | | | |
|---|---|---|---|
| 9,229,525 B2 | 1/2016 | Reller et al. | |
| 10,007,441 B2 | 6/2018 | Fuxa et al. | |
| 10,866,625 B2 | 12/2020 | Schneider et al. | |
| 10,895,904 B2 | 1/2021 | Sato | |
| 11,537,193 B2 | 12/2022 | Segev et al. | |
| 2017/0269860 A1* | 9/2017 | Geml | G06F 3/0634 |
| 2019/0250930 A1 | 8/2019 | Erez | |
| 2019/0303024 A1* | 10/2019 | Iwai | G06F 3/061 |
| 2023/0176742 A1* | 6/2023 | Muthiah | G06F 3/0679 |
| | | | 711/100 |

FOREIGN PATENT DOCUMENTS

| | | | | |
|---|---|---|---|---|
| GB | 2540882 A | * | 2/2017 | G06F 1/28 |

OTHER PUBLICATIONS

Foreign Docs.*

* cited by examiner

*Primary Examiner* — Mardochee Chery
(74) *Attorney, Agent, or Firm* — Patterson + Sheridan, LLP

(57) ABSTRACT

During operation of a data storage device, a controller of the data storage device may initiate read/write operations based on workloads provided by a host device. When initiating the read/write operations, power consumption and the data rate of the data storage device are generally high. Over time, the data rate corresponding to the workload decreases. Thus, the power consumption may be decreased to correspond with the decreased data rate. In order to maintain a high efficiency while decreasing an amount of power utilized, the controller may duty cycle the data storage device to operate between performance states to maintain a high data rate while decreasing power consumption.

18 Claims, 5 Drawing Sheets

| GENERATION | DATA TRANSFER RATE | BANDWIDTH X1 | BANDWIDTH X16 |
|---|---|---|---|
| PCIe 1.0 | 2.5 GT/s | 250 MB/s | 4.0 GB/s |
| PCIe 2.0 | 5.0 GT/s | 500 MB/s | 8.0 GB/s |
| PCIe 3.0 | 8.0 GT/s | 1 GB/s | 16.0 GB/s |
| PCIe 4.0 | 16 GT/s | 2 GB/s | 32.0 GB/s |
| PCIe 5.0 | 32 GT/s | 4 GB/s | 64.0 GB/s |
| PCIe 6.0 | 64 GT/s | 8 GB/s | 125.0 GB/s |

FIG. 3

HIGHLY EFFICIENT SSD POWER MANAGEMENT THROUGH PCIe DATA RATE MODULATION

BACKGROUND OF THE DISCLOSURE

Field of the Disclosure

Embodiments of the present disclosure generally relate to data storage devices, such as solid state drives (SSDs), and, more specifically, efficient power management of data storage devices capable of operating in a plurality of performance states.

Description of the Related Art

Peripheral Component Interconnect Express (PCIe) is a high speed interface standard for transferring data between components of a storage system. SSD products are evolving towards higher data rates and, at the same time, the silicon footprint of the processing nodes are decreasing. Higher data rates require additional power, and lower silicon footprints require greater thermal density. However, battery technology does not advance at the same rate as processing power advancement and data storage device advancements. Thus, it is imperative to enable higher data rates provided by processing power advancements and data storage device advancements while adhering to the thermal and power constraints of the data storage device.

In order to enable the higher data rates provided by modern data storage devices, a fixed PCIe Gen speed, which may be the highest PCIe Gen speed, is utilized. However, based on power requirements of the system, the data rate of the fixed PCIe Gen speed may be constrained and the data rate may be well below the max data rate corresponding to the fixed Gen speed. Likewise, throttling the data rate in order to adhere to the power requirements of the system may yield performance losses, which decrease a quality of service of the data storage device.

Therefore, there is a need in the art for an improved data storage device having

SUMMARY OF THE DISCLOSURE

The present disclosure generally relates to data storage devices, such as solid state drives (SSDs), and, more specifically, efficient power management of data storage devices capable of operating in a plurality of performance states. During operation of a data storage device, a controller of the data storage device may initiate read/write operations based on workloads provided by a host device. When initiating the read/write operations, power consumption and the data rate of the data storage device are generally high. Over time, the data rate corresponding to the workload decreases. Thus, the power consumption may be decreased to correspond with the decreased data rate. In order to maintain a high efficiency while decreasing an amount of power utilized, the controller may duty cycle the data storage device to operate between performance states to maintain a high data rate while decreasing power consumption.

In one embodiment, a data storage device includes a controller. The controller is configured to determine that the data storage device is operating at a first performance state of a plurality of performance states, determine that a threshold level for the first performance state has been reached, and transition the data storage device to operate at a second performance state of a plurality of performance states responsive to determining that the threshold level has been reached. The second performance state utilizes less power than the first performance state. The second performance state has a higher efficiency at a lower performance metric than the first performance state at a lower power utilization.

In another embodiment, a data storage device includes a controller. The controller is configured to track a data rate of a data bus of the data storage device, track a processing load of a front end of the data storage device, track a processing load of a back end of the data storage device, and cause the data storage device to cycle between operating in a first performance state and operating in a second performance state based on the data rate, the processing load of the front end, and the processing load of the back end. The second performance state utilizes less power than the first performance state. The second performance state has a higher efficiency at a lower performance metric than the first performance state at a lower power utilization.

In another embodiment, a data storage device includes means for storing data and a controller coupled to the means for storing data. The controller is configured to transition the data storage device between two or more performance states while transferring data. The transitioning is a duty cycle.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is an exemplary table illustrating different PCIe generations, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, efficient power management of data storage devices capable of operating in a plurality of performance states. During operation of a data storage device, a controller of the data storage device may initiate read/write operations based on workloads provided by a host device. When initiating the read/write operations, power consumption and the data rate of the data storage device are generally high. Over time, the data rate corresponding to the workload decreases. Thus, the power consumption may be decreased to correspond with the decreased data rate. In order to maintain a high efficiency while decreasing an amount of power utilized, the controller may duty cycle the data storage device to operate between performance states to maintain a high data rate while decreasing power consumption.

Figure 1:
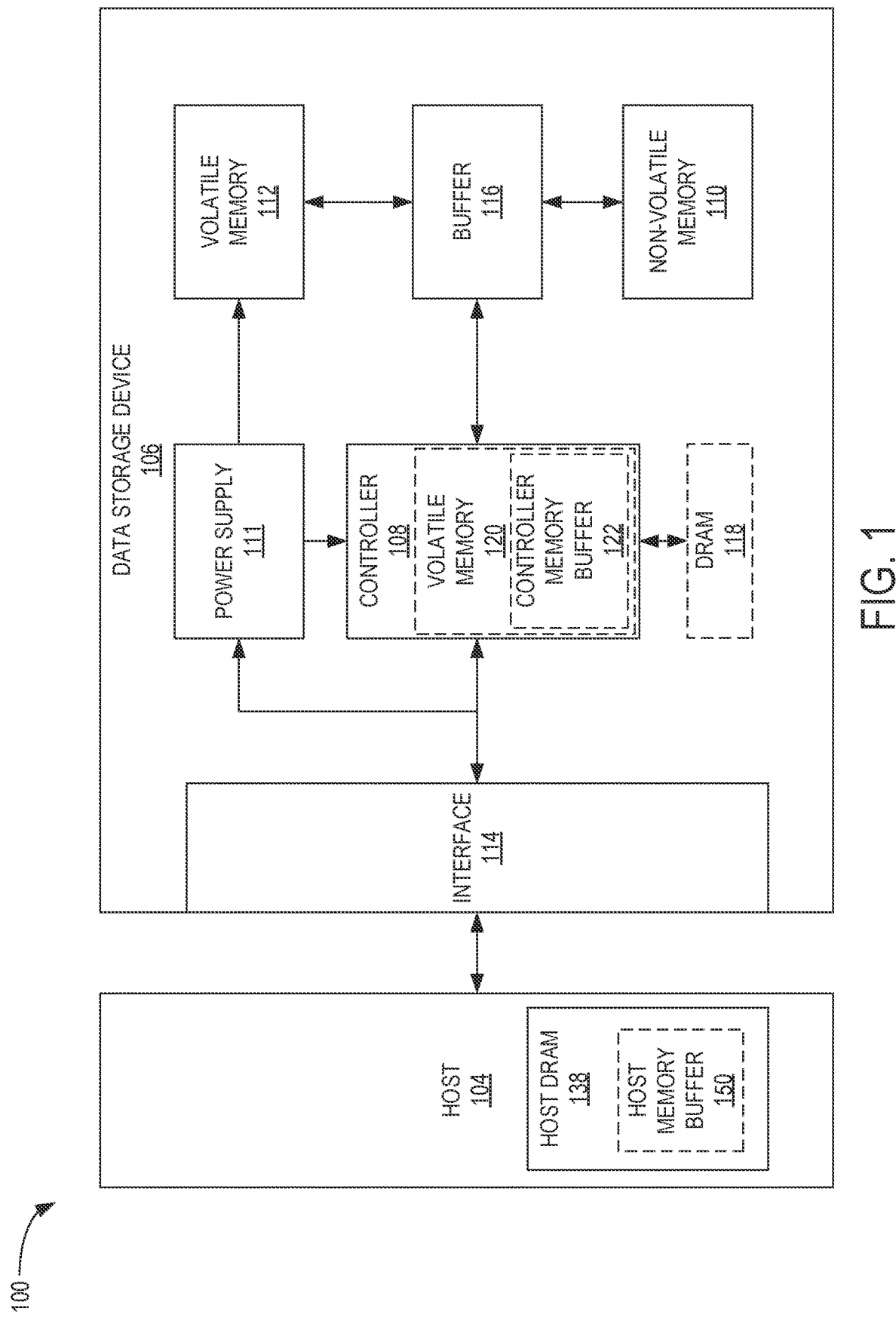
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). It is to be understood in that the listed memory architectures are not intended to be limiting, but to provide examples of possible embodiments. For example, it is contemplated that higher level cell memory may be applicable, such as penta level cell (PLC) memory and the like (e.g., 6-level cell, 7-level cell, etc.). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), synchronous dynamic RAM (SDRAM (e.g., DDR1, DDR2, DDR3, DDR3L, LPDDR3, DDR4, LPDDR4, and the like)), pseudo SRAM (PSRAM) block RAM (BRAM), thyristor RAM (TRAM), accelerator RAM (XRAM), and the like. Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory 120 to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
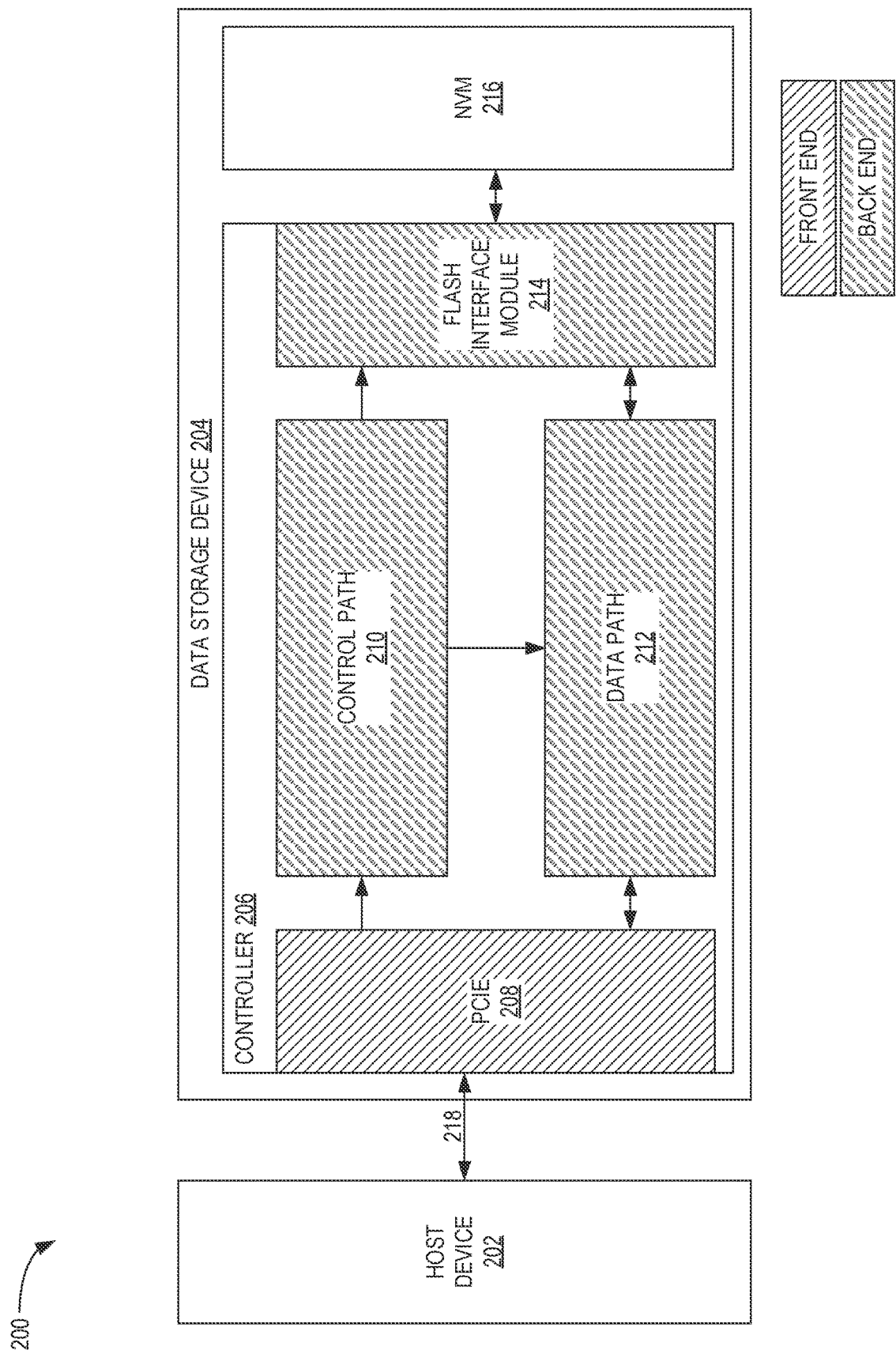
FIG. 2 is a schematic block diagram illustrating a storage system in which a data storage device may function as a storage device for a host device, according to certain embodiments.

FIG. 2 is a schematic block diagram illustrating a storage system 200 in which a data storage device 204 may function as a storage device for a host device 202, according to certain embodiments. Storage system 200 may be the storage system 100 of FIG. 1.

The data storage device 204 includes a controller 206 and an NVM 216. The controller 206 is configured to fetch (or receive) data and commands from the host device 202 via an interface, the PCIe interface 208. In other words, the transferring of data and commands between the PCIe interface 208 and the host device 202 is via a data bus 218. The commands are sent to the control path 210, where the control path 210 may include one or more processors, one or more central processing units, and the like for processing the received commands and generating the necessary control data for the received commands. Data is passed from the PCIe interface 208 to the data path 212, where the data path 212 may include a direct memory access (DMA), error correction code (ECC) engines, low-density parity-check (LDPC) engines, encoders, decoders, and the like. The data path 212 may be used to generate the necessary protection information for the data received from the host device 202 and be capable to recover lost or corrupted data from the NVM 216. The controller 206 further includes a flash interface module (FIM) 214. The FIM 214 may be configured to retrieve data from the NVM 216 and program data to the NVM 216. In the controller 206, the PCIe interface 208 may be a front end of the controller 206 and the control path 210, the data path 212, and the flash interface module 214 may be a back end of the controller 206.

FIG. 3 is an exemplary table 300 illustrating different PCIe generations, according to certain embodiments. Each PCIe generation exemplified in the exemplary table 300 may be the PCIe interface 208 of FIG. 2. It is to be understood that although PCIe is exemplified herein, the embodiments described may be applicable for other data storage device protocols. PCIe is a high-speed interface standard for coupling components of a data storage device, such as the data storage device 106 of FIG. 1, to each other as well as transferring data between components of the data storage device. There are different generations of PCIe devices, where each newer generation provides for greater data transfer rates and bandwidth. Furthermore, each PCIe interface may be configured as having one lane, 2 lanes, 4 lanes, 8 lanes, or 16 lanes. It is to be understood that the previously listed values are not intended to be limiting, but to provide an example of possible embodiments. Each PCIe generation (i.e., PCIe 1.0, PCIe 2.0, PCIe 3.0, PCIe 4.0, PCIe 5.0, PCIe 6.0) has an associated data transfer rate and bandwidth. For example, PCIe 1.0 (Gen 1) has a maximum data transfer rate of 2.5 GT/s, a bandwidth of 250 MB/s for one lane (X1), and a bandwidth of 4.0 GB/s for 16 lanes (X16).

Figure 4:
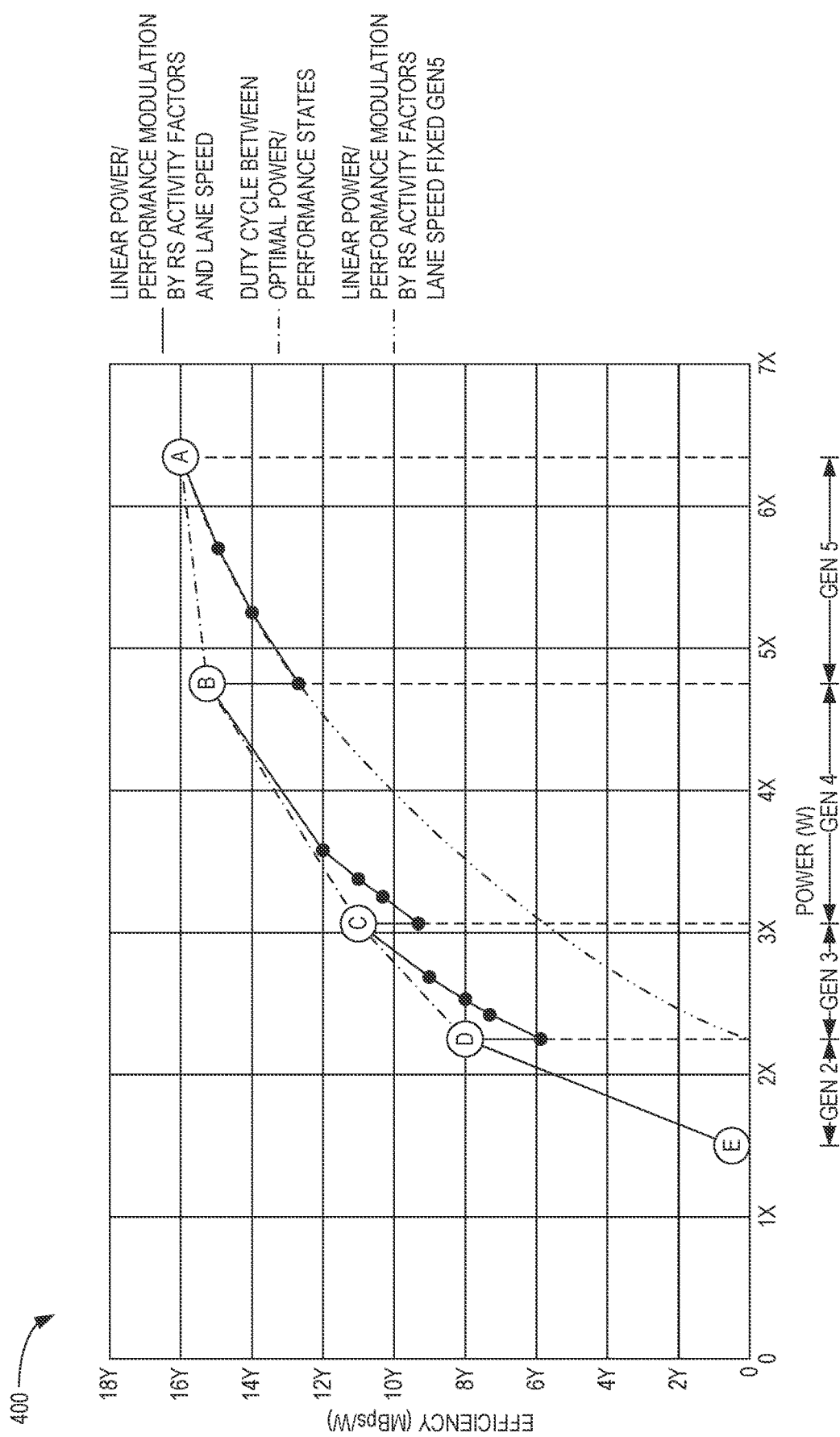
FIG. 4 is an exemplary graph illustrating an efficiency metric vs power metric of a data storage device a utilizing PCIe protocol, according to certain embodiments.

FIG. 4 is an exemplary graph 400 illustrating an efficiency metric (y-axis) vs power metric (x-axis) of a data storage device, such as the data storage device 204 of FIG. 2, utilizing a PCIe protocol, according to certain embodiments. Exemplary graph 400 illustrates the discrete power states derived from a PCIe Gen 5 (i.e., PCIe 5.0) data storage device. Each value (A, B, C, D, and E) represents an optimal power and efficiency combination for a respective PCIe Gen performance state. The optimal efficiency point for a PCIe based system is realized when the PCIe interface is saturated, i.e. maxed out, idle cycles with a PCIe interface that are not used for data I/O yields considerable wastage of power. As PCIe interfaces continue to progress with speed increase, they also become a larger contributor of power in the SSD system.

For example, when the data storage device 204 operates in the PCIe Gen 5 performance state, the optimal power and efficiency is achieved at point A. When the amount of power consumption is decreased while operating in PCIe Gen 5 performance state, the efficiency of the data storage device 204 decreases significantly. Power consumption is decreased by lowering the performance of the "Back-End" elements (described in FIG. 2) while the performance of the "Front-End" elements remain fixed, in this case PCIe Gen5. The performance asymmetry between the "Front-End" and the "Back-End" becomes one of the main problem statements addressed by the described embodiments. As shown by the dash dot dot dash curve, the efficiency of the data storage device operating in the PCIe Gen 5 performance state decreases significantly as power consumption is decreased. The same may hold true for the other performance states (as indicated by the solid curve). In other words, a system that does not saturate the PCIe link speed is inherently less efficient by wasting power at the bandwidth headroom. For example, if a data storage device is capable of outputting an average of 6 GB/s due to power/thermal limitations, the PCIe interface may spend power as if 8 GB/s were transferred. Thus, an additional amount of power is utilized without being able to realize the full transfer speed (e.g., 8 GB/s).

Referring to FIG. 4, a "primary operating state" consumes high power and yields high performance and a "secondary operating state" consumes less power and yields lower performance is shown. The primary operating state may lower its performance by lowering the performance of the back-end while front-end (PCIe) remains fixed. The primary operating state may lower its performance to the point that it is equal to the secondary operating state, by doing so it yields a lower system efficiency. As shown between the transition between A to B via the dash dot dot dash curve, where staying at the primary operating state (e.g., PCIe Gen 5 performance state) at point A results in an efficiency at point B of about 12.5 Y. However, if the primary operating state is transitioned to the secondary operating state (e.g., PCIe Gen 4 performance state) at point B, the efficiency is about 15 Y. Therefore, even though the data rate of the lower performance state (e.g., PCIe Gen 4 performance state) is less than that of the higher performance state (e.g., PCIe Gen 5 performance state), a higher system efficiency may be achieved.

However, by duty cycling between performance states (i.e., PCIe Gen states), efficiency of the data storage device 204 may be increased while lowering the power consumption of the data storage device. The dash dot dash curve exemplifies duty cycling between performance states. The duty cycling may occur between adjacent performance states or between non-adjacent performance states. In some examples, the duty cycling may cycle between three or more performance states. For example, as shown in the dash dot dash curve between points A and B, the efficiency of the data storage device 204 remains higher than the efficiency of the data storage device 204 operating only in the PCIe Gen 5 performance state (as shown by the dash dot dot dash curve). In other words, efficiency is the relationship between the data rate and the amount of power utilized.

The duty cycling may be an even split between the selected performance states or an uneven split between the selected performance state. For example, the data storage device 204 spend about 50% of the time in state A (e.g., Gen 5) and about 50% of the time in state B (e.g., Gen 4) during the duty cycle. In another example, the data storage device 204 spend less than 50% of the time in state A (e.g., Gen 5) and the remaining amount of time in state B (e.g., Gen 4) during the duty cycle (or vice versa). A controller, such as the controller 206 of FIG. 2, may determine how long to remain in each performance state during the duty cycling based on balancing data rates and a processing load between the front end (e.g., the PCIe interface data rate) and the back end (e.g., the data path, the control path, and the FIM data rates). For each discrete performance state (A, B, C, D, and E), a specific data storage device configuration vector is defined for internal data storage device parameters relating to one or more of a clock source and clock rate for one or more CPUs, computation parallelism, data bus lane speed, data bus lane width, and data bus asymmetry assignment for read/write commands. Furthermore, the controller 206 may communicate the duty cycling to the host device 202.

During operation of the data storage device 204, the host device 202 may send a workload (e.g., one or more read commands, one or more write commands, a mixture of one or more read commands and one or more write commands) to the data storage device 204. The workload may be a sequential workload or a random (i.e., non-sequential) workload. When the workload is first received, the data storage device 204 operates at a data rate based on an available amount of power. For example, data rate may be equivalent to point A on the exemplary graph 400. However, after a period of time has elapsed, the data rate may decrease due to less overhead/bandwidth needed. When the data rate decreases, the controller 206 may decrease the power consumption by the data storage device.

However, rather than decreasing the power consumption while maintaining the same performance state, the controller 206 may duty cycle the data storage device 204 to operate between two or more performance states (e.g., between Gen 5 and Gen 4) in order to take advantage of the lower power requirements of the lower performance state and the higher data rate of the higher performance state. In other words, by duty cycling the data storage device 204 between performance states, an optimized data rate efficiency may be achieved while decreasing an amount of power consumed. The controller 206 may determine to transition the data storage device 204 from operating in a first performance state to a second performance state (in a duty cycle) based on a constraint of power threshold and/or a thermal capacity threshold. In other words, if the controller 206 determines that, while operating in Gen 5, a thermal threshold of the data storage device 204 has been reached or that a power threshold has been reached, the controller 206 may transition the data storage device to operate in Gen 4 or a lower performance state. Thus, the transitioning may be based on a power consumption threshold, a temperature threshold, a data rate threshold, or the like.

Figure 5:
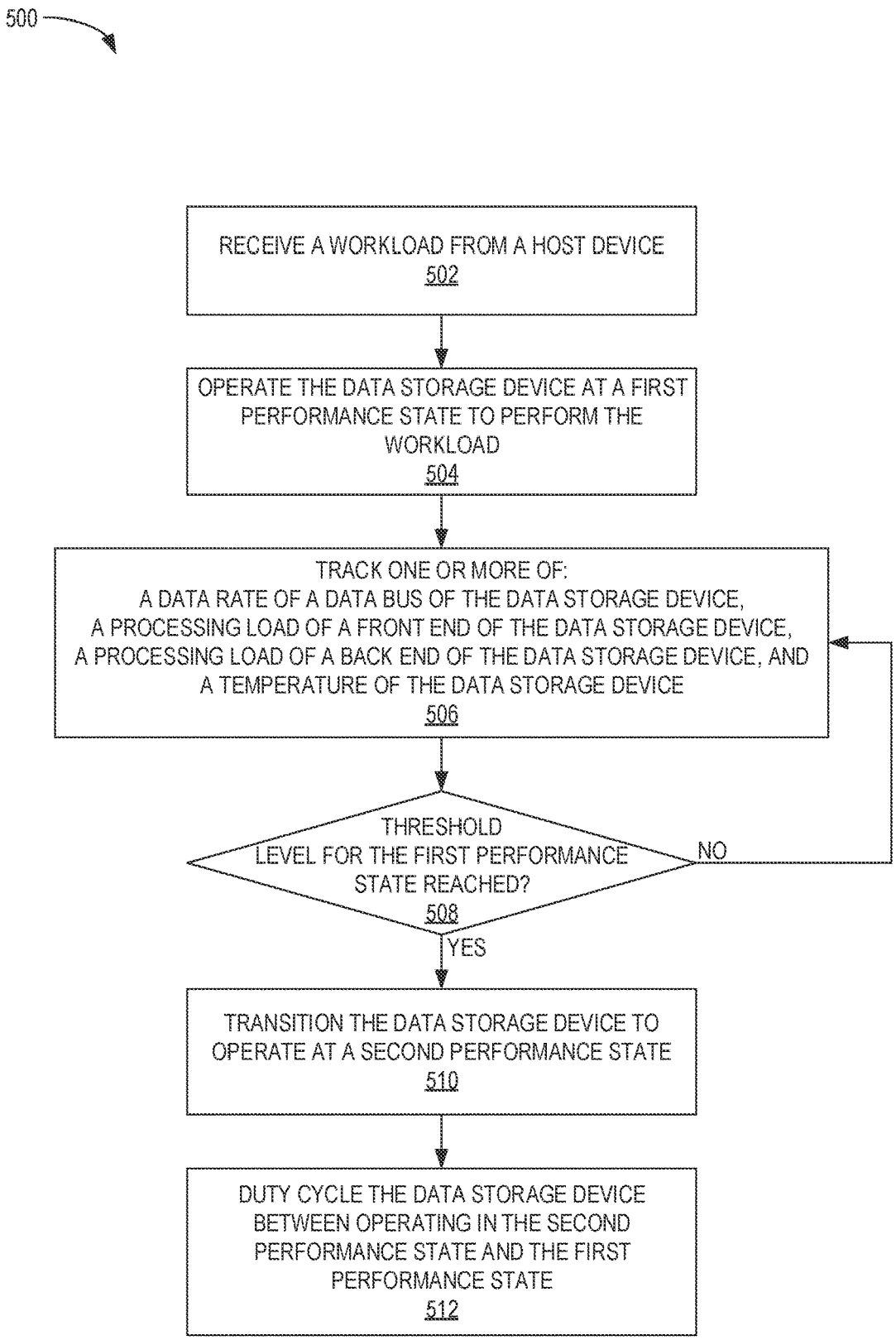
FIG. 5 is a flow diagram illustrating a method of duty cycling a data storage device, according to certain embodiments.

FIG. 5 is a flow diagram illustrating a method 500 of duty cycling a data storage device, according to certain embodiments. Method 500 may be implemented by a controller, such as the controller 206 of FIG. 2. For exemplary purposes, aspects of the storage system 200 of FIG. 2 may be referenced herein.

At block 502, the controller 206 receives a workload from the host device 202. At block 504, the controller 206 operates the data storage device 204 at a first performance state to perform the workload. For example, the first performance state may be PCIe Gen 5 performance state. At block 506, the controller 206 tracks one or more of a data rate of a data bus of the data storage device 204, a processing load of the front end of the data storage device 204, a processing load of the back end of the data storage device 204, a temperature of the data storage device 204, and the like. At block 508, the controller 206 determines if a threshold level for any of the tracked parameters of the first performance state has been reached. If the threshold level for any of the tracker parameters of the first performance state has not been reached at block 508, then method 500 returns to block 506.

However, if the threshold level for any of the tracker parameters of the first performance state has been reached at block 508, then the controller 206 transitions the data storage device to operate at a second performance state at block 510. For example, the second performance state may be PCIe Gen 4 performance state. At block 512, the controller 206 duty cycles the data storage device 204 to operate between the first performance state and second performance state, where a time spent in each performance state is optimized based on the data rate needed and minimizing an amount of power consumption of the data storage device 204.

By duty cycling performance states of a data storage device, decreasing power consumption by the data storage device while optimizing data rate efficiency may be achieved, thus, increasing data storage device quality of service.

In one embodiment, a data storage device includes a controller. The controller is configured to determine that the data storage device is operating at a first performance state of a plurality of performance states, determine that a threshold level for the first performance state has been reached, and transition the data storage device to operate at a second performance state of a plurality of performance states responsive to determining that the threshold level has been reached. The second performance state utilizes less power than the first performance state. The second performance state has a higher efficiency at a lower performance metric than the first performance state at a lower power utilization.

The threshold level is a temperature threshold level of the data storage device. The threshold level is a power consumption threshold based on a current performance state of the data storage device. The controller is further configured to determine that a first calculated period of time has elapsed since transitioning to the second performance state and transition the data storage device to operate at the first performance state. The controller is further configured to determine that a second calculated period of time has elapsed since transitioning to the first performance state after transitioning to the first performance state and transition the data storage device to operate at the second performance state. One or more performance states of the plurality of performance states exists between the first performance state and the second performance state. The one or more performance states utilizes less power than the first performance state. The one or more performance states utilizes greater power than the second performance state. The one or more performance states has a higher efficiency at a lower performance metric than the first performance state. The one or more performance states has a lower efficiency at a lower performance metric than the second performance state. Each performance state of the plurality of performance states includes a distinct configuration of one or more of a clock source and clock rate for one or more central processing units (CPUs), computation parallelism, data bus lane speed, data bus lane width, and data bus asymmetry assignment for read/write commands. Transitioning the data storage device further includes alternating the data storage device to operate between the first performance state and the second performance state based on balancing a data rate and a processing load between a front end of the data storage device and a processing load of a back end of the data storage device. An amount of time spent in the first performance state and an amount of time spent in the second performance state during the alternating is dependent on a workload of the data storage device.

In another embodiment, a data storage device includes a controller. The controller is configured to track a data rate of a data bus of the data storage device, track a processing load of a front end of the data storage device, track a processing load of a back end of the data storage device, and cause the data storage device to cycle between operating in a first performance state and operating in a second performance state based on the data rate, the processing load of the front end, and the processing load of the back end. The second performance state utilizes less power than the first performance state. The second performance state has a higher efficiency at a lower performance metric than the first performance state at a lower power utilization.

A time of operating in the first performance state and a time of operating in the second performance state during the cycling are equal. A time of operating in the first performance state and a time of operating in the second performance state during the cycling are unequal. The controller is further configured to cause the data storage device to cycle between operating in the first performance state, operating in the second performance state, and operating in a third performance state based on the data rate, the processing load of the front end, and the processing load of the back end. The third performance state utilizes less power than the first performance state and the second performance state. The third performance state has a higher efficiency at a lower performance metric than the first performance state and the second performance state at a lower power utilization. The cycling between operating in the first performance state and operating in the second performance state is further based on a temperature threshold of the data storage device. The cycling between operating in the first performance state and operating in the second performance state is further based on a power utilization threshold of the data storage device. The controller is further configured to communicate the cycling to a host device. The controller is further configured to determine that a new workload has been received and transition the data storage device to a performance state without cycling between performance states.

In another embodiment, a data storage device includes means for storing data and a controller coupled to the means for storing data. The controller is configured to transition the data storage device between two or more performance states while transferring data. The transitioning is a duty cycle. The controller is further configured to initiate transitioning the data storage device between two or more performance states responsive to determining that a data rate of transferring the data is less than threshold data rate for a current performance state of the two or more performance states. Each performance state of the two or more performance states has a different data rate and a different power consumption. Transitioning the data storage device between the two or more performance states includes decreasing an amount of power utilized while transferring the data and increasing the data rate while transferring the data.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
 a controller, wherein the controller is configured to:
  determine that the data storage device is operating at a first performance state of a plurality of performance states;
  determine that a threshold level for the first performance state has been reached; and
  transition the data storage device to operate at a second performance state of a plurality of performance states responsive to determining that the threshold level has been reached, wherein:
   the second performance state utilizes less power than the first performance state;
   the second performance state has a higher efficiency at a lower performance metric than the first performance state at a lower power utilization;
   one or more performance states of the plurality of performance states exists between the first performance state and the second performance state;
   the one or more performance states utilizes less power than the first performance state;
   the one or more performance states utilizes greater power than the second performance state;
   the one or more performance states has a higher efficiency at a lower performance metric than the first performance state; and
   the one or more performance states has a lower efficiency at a higher performance metric than the second performance state.

2. The data storage device of claim 1, wherein the threshold level is a temperature threshold level of the data storage device.

3. The data storage device of claim 1, wherein the threshold level is a power consumption threshold based on a current performance state of the data storage device.

4. The data storage device of claim 1, wherein the controller is further configured to:
 determine that a first calculated period of time has elapsed since transitioning to the second performance state; and
 transition the data storage device to operate at the first performance state.

5. The data storage device of claim 4, wherein the controller is further configured to:
 determine that a second calculated period of time has elapsed since transitioning to the first performance state after transitioning to the first performance state; and
 transition the data storage device to operate at the second performance state.

6. The data storage device of claim 1, wherein each performance state of the plurality of performance states comprises a distinct configuration of one or more of:
 a clock source and clock rate for one or more central processing units (CPUs);
 computation parallelism;
 data bus lane speed;
 data bus lane width; and
 data bus asymmetry assignment for read/write commands.

7. The data storage device of claim 1, wherein transitioning the data storage device further comprises alternating the data storage device to operate between the first performance state and the second performance state based on balancing a data rate and a processing load between a front end of the data storage device and a processing load of a back end of the data storage device.

8. The data storage device of claim 7, wherein an amount of time spent in the first performance state and an amount of time spent in the second performance state during the alternating is dependent on a workload of the data storage device.

9. A data storage device, comprising:
 a controller, wherein the controller is configured to:
  track a data rate of a data bus of the data storage device;
  track a processing load of a front end of the data storage device;
  track a processing load of a back end of the data storage device; and
  cause the data storage device to cycle between operating in a first performance state, operating in a second performance state, and operating in a third performance state based on the data rate, the processing load of the front end, and the processing load of the back end, wherein:
   the second performance state utilizes less power than the first performance state;
   the second performance state has a higher efficiency at a lower performance metric than the first performance state at a lower power utilization;
   the third performance state utilizes less power than the first performance state and the second performance state; and the third performance state has a has a higher efficiency at a lower performance metric than the first performance state and the second performance state at a lower power utilization.

10. The data storage device of claim 9, wherein a time of operating in the first performance state and a time of operating in the second performance state during the cycling are equal.

11. The data storage device of claim 9, wherein a time of operating in the first performance state and a time of operating in the second performance state during the cycling are unequal.

12. The data storage device of claim 9, wherein the cycling between operating in the first performance state and operating in the second performance state is further based on a temperature threshold of the data storage device.

13. The data storage device of claim 9, wherein the cycling between operating in the first performance state and operating in the second performance state is further based on a power utilization threshold of the data storage device.

14. The data storage device of claim 9, wherein the controller is further configured to communicate the cycling to a host device.

15. The data storage device of claim 9, wherein the controller is further configured to:
   determine that a new workload has been received; and
   transition the data storage device to a performance state without cycling between performance states.

16. A data storage device, comprising:
   means for storing data; and
   a controller coupled to the means for storing data, wherein the controller is configured to:
      transition the data storage device to operate at three or more performance states while transferring data, wherein the transitioning is a duty cycle; and
      initiate transitioning the data storage device between the three or more performance states responsive to:
         determining that a data rate of transferring the data is less than threshold data rate for a current performance state of the three or more performance states;
      wherein:
         a third performance state of the three or more performance states uses less power than a second and a first performance state of the three or more performance states;
         the second performance state uses less power than the first performance state;
         the third performance state has a higher efficiency at a lower performance metric than the second and the first performance state; and
         the second performance state has a higher efficiency at a lower performance metric than the first performance state.

17. The data storage device of claim 16, wherein each performance state of the three or more performance states has a different data rate and a different power consumption, and wherein transitioning the data storage device between the three or more performance states comprises decreasing an amount of power utilized while transferring the data and increasing the data rate while transferring the data.

18. The data storage device of claim 16, wherein the transitioning comprises causing the data storage device to cycle between operating in the first performance state, operating in the second performance state, and operating in the third performance state.

* * * * *